(12) United States Patent
Yang et al.

(10) Patent No.: US 6,226,275 B1
(45) Date of Patent: May 1, 2001

(54) WIDE BAND HIGH POWER ULTRALINEAR RF TRANSRECEIVER

(75) Inventors: Zhang Ping Yang; Shiping Li; Yucong Gu, all of Alameda, CA (US)

(73) Assignee: UTStarcom, Inc., Alameda, CA (US)

( * ) Notice: Subject to any disclaimer, the term of this patent is extended or adjusted under 35 U.S.C. 154(b) by 0 days.

(21) Appl. No.: 09/383,110

(22) Filed: Aug. 25, 1999

(51) Int. Cl.[7] .................... H04J 3/00; H04B 1/46
(52) U.S. Cl. .................................. 370/280; 455/80
(58) Field of Search ............................. 370/276, 277, 370/278, 280, 282, 293, 294, 339; 455/80, 82, 83, 88, 86, 87, 106, 107, 108, 78, 67.3, 117, 67.1; 333/1.1

(56) References Cited

U.S. PATENT DOCUMENTS

| | | |
|---|---|---|
| 2,890,328 | 6/1959 | Fox .................................. 250/13 |
| 3,276,019 | 9/1966 | Fackler .............................. 343/175 |
| 3,309,698 | 3/1967 | Baldock ............................. 343/5 |
| 4,055,087 | 10/1977 | Priniski et al. ................... 325/21 |
| 4,361,905 | 11/1982 | Etherington et al. ............. 455/80 |
| 4,380,822 | 4/1983 | Broton ............................... 455/80 |
| 4,489,413 | * 12/1984 | Richmond et al. ................ 370/278 |
| 4,641,365 | * 2/1987 | Montini, Jr. ....................... 455/78 |
| 4,761,821 | * 8/1988 | Mawhinney et al. .............. 455/73 |
| 5,022,742 | 6/1991 | Hains ................................ 350/355 |
| 5,313,138 | 5/1994 | Desmur ............................. 315/3 |
| 5,374,589 | 12/1994 | Roush et al. ...................... 437/166 |
| 5,477,532 | 12/1995 | Hoshigami et al. ............... 370/24 |
| 5,594,394 | 1/1997 | Sasaki et al. ...................... 333/103 |
| 5,701,595 | 12/1997 | Green, Jr. .......................... 455/83 |
| 5,822,684 | 10/1998 | Kitakubo .......................... 455/78 |
| 6,005,884 | * 12/1999 | Cook et al. ....................... 375/202 |

* cited by examiner

Primary Examiner—Wellington Chin
Assistant Examiner—Steven Nguyen
(74) Attorney, Agent, or Firm—Claude A. S. Hamrick; Justin Boyce; Oppenheimer Wolff & Donnelly LLP (57) ABSTRACT

A time division duplex switching circuit provides for selectively coupling signals between an antenna and a front stage transceiver circuit. The switching circuit is operative in a transmit mode and in a receive mode, and includes: a transmitter amplifier having an input and an output; a receiver amplifier having an input and an output; a first circulator including a first port coupled for communication with the front stage transceiver, a second port selectively coupled with the output of the receiver amplifier via a first switching, and a third port selectively coupled with the input of the transmitter amplifier via a second switching; and a second circulator including a first port coupled for communication via the antenna, a second port coupled with the input of the receiver amplifier, and a third port coupled with the output of the transmitter amplifier. The second switching is operative in the receive mode to connect the third port of the first circulator to a first load impedance for absorbing energy reflected from the front stage transceiver via the first circulator, and is operative in the transmit mode to connect the third port of the first circulator to the input of the transmitter amplifier. The first switching is operative in the transmit mode to connect the second port of the first circulator to a second load impedance for absorbing energy reflected from the input of the transmitter amplifier via the first circulator, and is operative in the receive mode to connect the second port of the first circulator to the output of the receiver amplifier.

20 Claims, 6 Drawing Sheets

WIDE BAND HIGH POWER ULTRALINEAR RF TRANSRECEIVER

FIELD OF THE INVENTION

The present invention relates generally to wireless communication systems. More particularly, the present invention relates to a linear transceiver antenna switching circuit for use in high power time division duplex (TDD) wireless communication base station systems.

BACKGROUND OF THE INVENTION

Wireless communication systems include paging systems, trunk group communication systems, cordless telecommunication systems, and cellular mobile communication systems. Current important research topics in wireless communication systems focus on increasing system subscriber capacity and spectrum utilization rate, while reducing systems costs. State of the art wireless systems must provide a variety of features including voice communication, paging, message transmission, group dispatch communication, locating position features, and data communication.

Wireless communications systems, such as cellular and personal communications systems, operate over limited spectral bandwidths and must make highly efficient use of the scarce bandwidth resource for providing quality service to a large population of users. Code Division Multiple Access (CDMA) protocol is commonly used for wireless communications systems for making efficiently use of limited bandwidths.

The use of wide-band multi-carrier RF technology and Time Division Duplex (TDD) technology in wireless communication systems provides a variety of advantages including increased spectrum utilization rates, low cost RF components, and simplified RF circuit structures. The use of wide-band multi-carrier RF and TDD technologies in wireless communication systems has also allowed for improved locating position features for determining the positions of subscriber terminals. Furthermore, wide-band multi-carrier RF and TDD technologies have allowed for efficient use of digital beam forming (DBF) based on a smart antenna for the purposes of reducing multi-path fading, raising coverage ranges, improving the accuracy of locating positions, and reducing the transmit power required for subscriber terminals.

The of multi-carrier RF transceiver systems reduces the complexity and costs of TDD base stations. Time division duplex (TDD) radio transceiver systems are used for providing duplex radio communications by alternately transmitting and receiving on a time division basis. In such systems, a transmitter and a receiver operate in time division duplex to transmit and receive respectively in different time slots. Therefore, a single antenna needs to be connected at any instant to either the transmitter or receiver but not to both simultaneously.

For wide-band multi-carrier TDD radio transceiver systems, it is important to optimize the linearity of multi-carrier RF circuits used therein. For example, a multi-carrier RF transceiver must be linear enough to ensure that the 3rd-order intermodulation distortion (IM3) of the transmitter amplifier is less than some value. For example, it is desirable that the intermodulation distortion of the transmitter amplifier have a value of −60 dBc while the transmitter provides an output power of +40 dBm. Conventional antenna switching circuits used in wide-band multi-carrier TDD radio transceiver systems do not meet this criteria. Therefore, the development of TDD wireless communications system has been limited.

Some antenna switching circuits have been designed for lower transmitting power wireless communication systems (e.g., CT2, PHS). However, these antenna switching circuits are not easily adapted to provide higher output power if it is desired.

Figure 1:
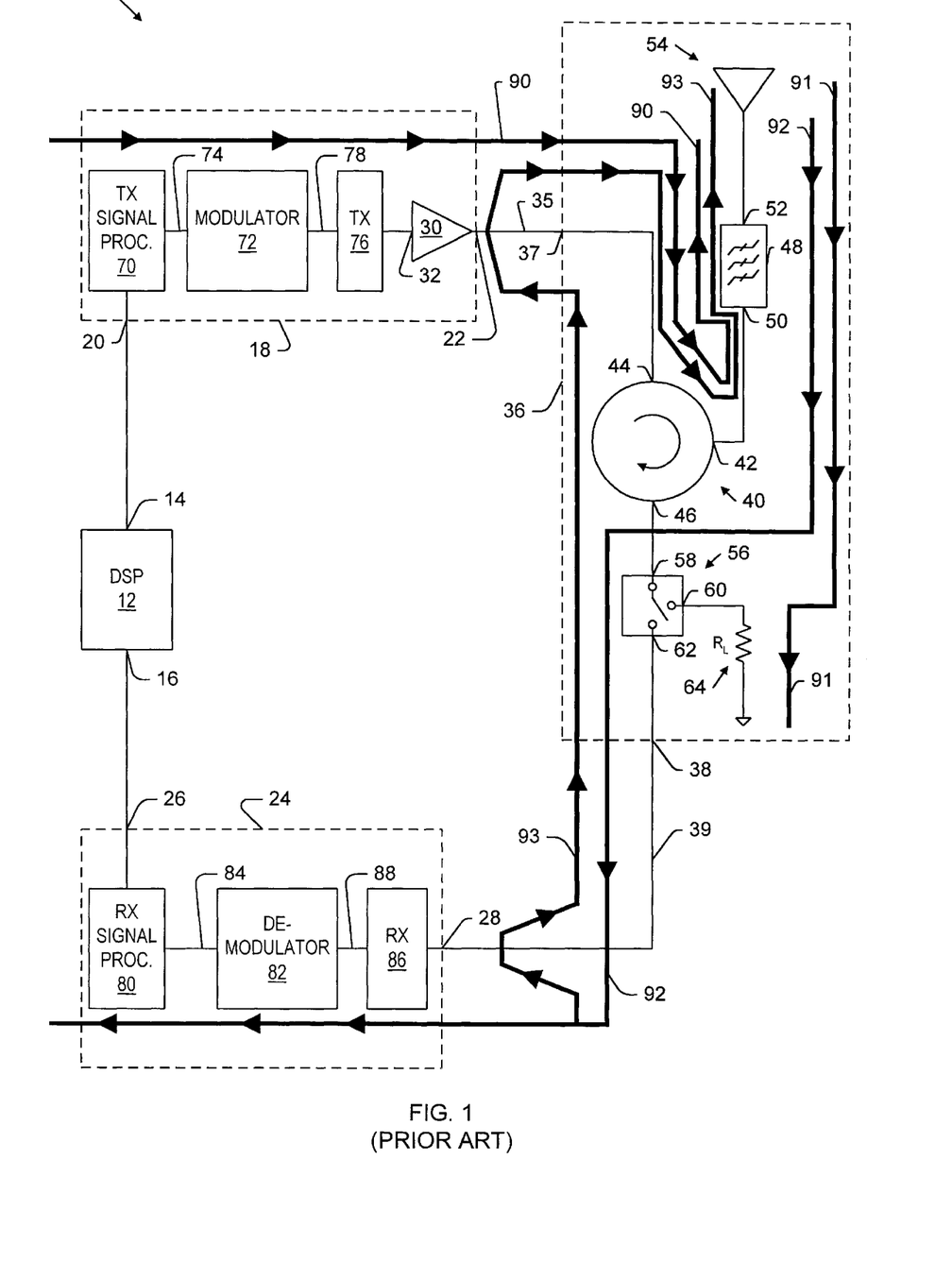
FIG. 1 is a schematic circuit diagram of a typical prior art full duplex radio transceiver system for use in a wireless time division duplex (TDD) communication system.

FIG. 1 shows a schematic circuit diagram at 10 of a typical prior art full duplex transceiver having time division duplex (TDD) features. The transceiver 10 includes: a digital signal processor (DSP) 12 having a first port 14, and a second port 16; a transmitter subsystem 18 having a first port 20 coupled for communication with port 14 of the DSP, and a second port 22 for providing a transmission signal; a receiver subsystem 24 having a first port 26 coupled for communication with port 16 of the DSP, and a second port 28; and an antenna switching circuit 36 having a port 37 coupled to port 22 of the transmitter subsystem via a cable 35, and a port 38 coupled to provide a received RF signal to port 28 of the receiver subsystem 24 via a cable 39.

The antenna switching circuit 36 includes: an RF circulator 40 formed by a three-port transfer device having a first port 42, a second port 44 coupled to receive the transmission signal from port 22 of the transmitter subsystem, and a third port 46; a band pass filter 48 having a first port 50 coupled with the first port 42 of the RF circulator 40, and a second port 52 coupled with an antenna 54; a switch 56 having a first port 58 coupled with port 46 of the circulator, a second port 60, and a third port 62 coupled with port 28 of the receiver subsystem 24 via port 38 of the antenna switching circuit; and a load impedance 64 having an impedance value RL, and having a first terminal connected to the second port 60 of the circulator, and a second terminal connected to ground.

The transmitter subsystem 18 includes: a transmitter signal processing unit 70 coupled for communication with port 14 of the DSP via port 20 of the transmitter subsystem; a modulator unit 72 having a first port coupled to receive a base band signal from unit 70 via a path 74; a transmitter 76 having a first port coupled for communication with modulator 72 having a first port coupled to receive a base band signal from unit 70 via a path 78; and a power amplifier 30 having an input 32 coupled to receive a signal from transmitter 76, and an output 34 providing the transmission signal at port 22 of the transmitter subsystem. The receiver subsystem 24 includes: a receiver signal processing unit 80 coupled for communication with port 16 of the DSP via port 26 of the receiver subsystem; a demodulator unit 82 coupled to unit 80 via a path 84; and a receiver 86 having a first port coupled for communication with demodulator 82 via a path 88, and a second port coupled for communication with the third port 62 of switch 56 of the antenna switching circuit via the cable 39.

The circulator 40 facilitates signal transfer in an upstream direction, and minimizes signal transfer in a downstream direction. For signals propagating in the downstream direction (from port 44 to port 42, from port 42 to port 46, and from port 46 to port 44), insertion loss is approximately 0.7 dB. For signals propagating in the upstream direction (from port 42 to port 44, from port 44 to port 46, and from port 46 to port 42), insertion loss is approximately 30 to 40 dB. The band pass filter 48 attenuates unnecessary radio waves in both the transmitting mode and the receiving mode. In a TDD mode, the transmitting frequency is substantially equal to the receiving frequency.

In a transmit mode of operation of the depicted transceiver 10, switch 56 of the antenna switching circuit is controlled so that its first port 58 is connected to its second port 60. In a receive mode, switch 56 of the antenna switching circuit is controlled so that its first port 58 is connected to its third port 62.

In the transmit mode, a base-band signal is generated by unit 70, modulated by modulator 72, transmitted by the transmitter 76, and amplified by amplifier 30 to generate the transmission signal at port 22 of the transmitter subsystem. The circulator 40 of the antenna switching circuit is operative to circulate the transmission signal received at its second port 44 to its first port 42 which is connected to the antenna 54 via the band pass filter 48. The generation of the transmission signal by the transmitter subsystem 18 and the switched path of the transmission signal by the switching circuit 36 operating in the transmit mode is illustrated by a transmission path 90.

A reflection problem arises in the transmit mode if the impedances of antenna 54 and filter 48 are not properly matched to the impedance of the first port 42 of the circulator. Such an impedance mismatch may arise due to antenna match errors, filter match errors, or variations in environmental conditions. In the event of such an impedance mismatch, RF power is reflected from the antenna 54 back to port 42 of the circulator. However, the circulator is operative to circulate this reflected RF power from port 42 to port 46 which is connected to port 58 of switch 56. As mentioned above, in the transmit mode, switch 56 is set so that port 58 is coupled to port 60, and therefore a transmission reflection path 91 is created so that any RF power reflected from the antenna and band pass filter is circulated from port 42 to port 46, transferred by switch 56 from port 58 to port 60, and absorbed by the load impedance 64. Note that any reflected RF power received at port 42 is substantially isolated from the transmitter subsystem 18 by the circulator 40 because port 44, which is connected to the transmitter subsystem, is upstream from and therefore substantially isolated from port 42 as explained above.

In the receive mode of operation, wherein port 58 of switch 56 is connected to port 62, a receive path 92 is created so that an incoming signal received at antenna 54 is provided via the switching circuit 36 to port 28 of the receiver subsystem 24. The incoming signal received at the antenna propagates along the receive path 92 which extends from antenna 54 to receiver signal processing unit 80, and which traverses filter 48, ports 42 and 46 of circulator 40, ports 58 and 62 of switch 56, receiver 86, and demodulator 82.

A reflection problem arises in the transceiver 10 during operation in the receive mode if the input impedance of the receiver 86 and the impedance of cable 39 are not properly matched. In this case, a portion of the incoming signal provided from the antenna to the receiver subsystem 24 is reflected from the input of the receiver 86 back to port 46 of circulator 40 via switch 56. The circulator is operative to circulate the reflected portion of the incoming signal from port 46 to port 44 which is connected to the output of the power amplifier 30 via cable 35. Because the power amplifier 30 is OFF during operation in the receive mode, and because the output impedance at the output of the power amplifier 30 can not be matched with the impedance of the cable 35 while the amplifier 30 is OFF, a second portion of the incoming signal is reflected by amplifier 30 back toward port 44 of the circulator. The circulator is operative to circulate the second reflected portion of the incoming signal from port 44 to port 42 which is connected to the antenna via the band pass filter.

Therefore, incoming signals provided to the receiver subsystem 24 are reflected along a receive signal reflection path 93 which includes: a first portion extending from the input of the receiver 86 to the output of the power amplifier 30 via switch 56 and circulator 40; and a second portion extending from the output of amplifier 30 to the antenna via ports 44 and 42 of the circulator 40, and the band pass filter 48. Note that if another impedance mismatch is also present at the antenna 54, a third portion of the incoming signal is reflected yet again from the antenna 54.

Figure 2:
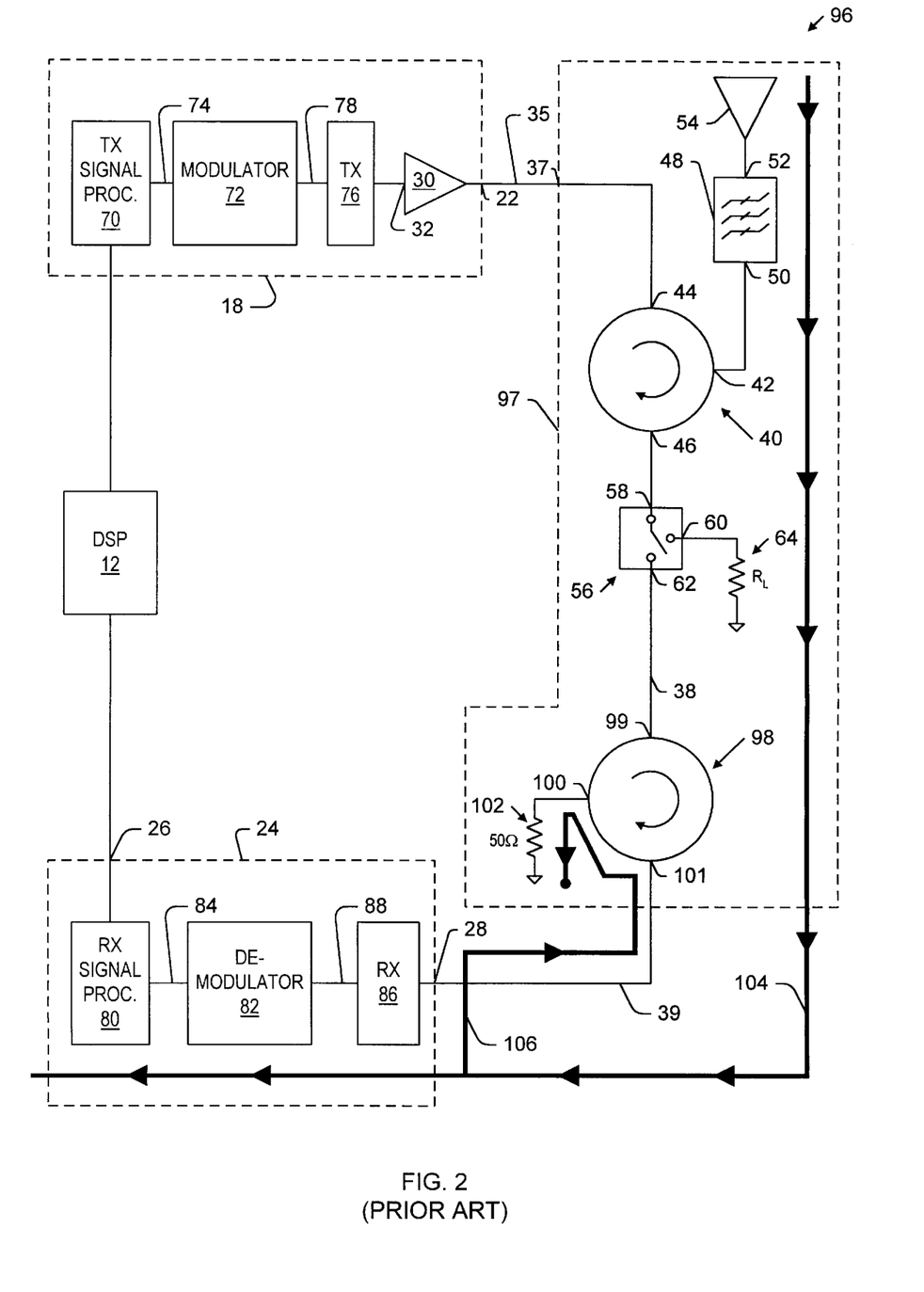
FIG. 2 is a schematic circuit diagram of another typical prior art full duplex radio transceiver system.

With reference to FIG. 2, in order to prevent the above described reflection problems arising in the transceiver 10 (FIG. 1) during operation in the receive mode, a second circulator 98 is inserted into the antenna switching circuit to provide isolation between the switch 56 of the antenna switching circuit and the receiver subsystem 24 of the transceiver 10 (FIG. 1). As shown in FIG. 2, an improved prior art transceiver circuit 96 comprises the DSP 12, transmitter subsystem 18, receiver subsystem 24, and an improved antenna switching circuit 97 which includes all of the components of the antenna switching circuit 36 (FIG. 1) in addition to: the second circulator 98 which has a first port 99 connected to port 62 of switch 56, a second port 100, and a third port 101 connected to the input of the receiver 86 via port 28 of the receiver subsystem; and a load impedance 102 having a resistance of 50 Ohms, and having a first terminal connected to port 100 of the second circulator, and a second terminal connected to ground.

Switch 56 of the antenna switching circuit 97 is controlled in the same manner as described above in the switching circuit 36 of the transceiver 10 (FIG. 1). During operation in the receive mode, any RF energy reflected by the receiver 86 is reflected back to port 101 of circulator 98, circulated from port 101 to port 100, and provided to the load impedance 102 which absorbs the reflected RF energy.

The insertion of the second circulator 98 into the transceiver 10 (FIG. 1) to form the transceiver 96 provides for a receive path 104 having an insertion loss which is approximately 0.7 dB larger than the insertion loss of the receive path 92 of transceiver 10 (FIG. 1). Therefore, the receiver sensitivity of the transceiver 96 is decreased by 0.7 dB relative to the transceiver 10 (FIG. 1) as a result of the addition of the second circulator 98 to the circuit.

Assume that the insertion loss of the band pass filter 48 is about 1.3 dB, the insertion loss of the electronic switch 56 is about 0.7 dB (e.g., if switch 56 is implemented by a Stanford Microdevices switch, model SSW-224), and the insertion loss of each of the circulators 92 is approximately 0.7 dB. In this case, the insertion loss of the transmitting path 90 (FIG. 1) is approximately 2.0 dB, and the insertion loss of the receiver path 104 (FIG. 2) is approximately 3.4 dB.

Assume that the required output power of amplifier 30 is 10 Watts, or 40 dBm. Due to the insertion loss of the transmitting path 90, the output power delivered to the antenna is reduced to approximately 6.3 Watts. Therefore, the first circulator 40 and the band pass filter 48 consume 37 percent of the power output by the amplifier 30. If 10 W is required at the antenna output port, then the required output power of the power amplifier 30 is 15.8 W. Such a power requirement increases the difficulty of designing a transceiver. It is even more difficult to implement a linear multi-carrier transceiver wherein the IM3 is less than −60 dBc. In such a case, the efficiency of the amplifier 30 is only approximately 5 to 10 percent.

Still referring to FIG. 2, note that two cables 35 and 39 are required to connect port 22 of the transmitter subsystem 18 and port 28 of the receiver subsystem 24 to the antenna 54 via the antenna switching circuit 97. In order to optimize system performance, high quality cables must be used to implement the cables 35 and 39, and such high quality cables are costly. Therefore, it would be advantageous if only one cable were required for establishing the connection between the transmitter subsystem and receiver subsystem and the antenna 54 via an antenna switching circuit. The savings in cost and reduced complexity as a result of requiring only one cable for this connection would be particularly advantageous in a wireless communication base station system which typically includes a plurality of antennas configured in an antenna array.

SUMMARY OF THE INVENTION

It is an object of the present invention to provide an ultra-linear transceiver antenna switching circuit for use in a high transmitting power TDD wireless communication base station system.

Another object of the present invention is to provide a TDD wireless communication base station system wherein the mechanical complexity associated with connecting a transceiver system to a corresponding antenna is reduced.

A further object of the present invention is to provide an ultra-linear transceiver antenna switching circuit having increased isolation between the receiving path and the transmitting path.

Yet another object of the present invention to provide an ultra-linear transceiver antenna switching circuit having increased receiver sensitivity.

Yet another object of the present invention to provide a transceiver system having a front stage and an antenna switching stage, wherein the front stage provides a small output power, and wherein the antenna switching stage provides a high power output.

Briefly, the present invention provides a time division duplex transceiver system for use in a multi-carrier wireless communication system, the system being operative in a transmit mode and in a receive mode. The system includes: an antenna for transmitting and receiving information; a front stage transceiver circuit having a front stage port for transmitting and receiving signals via the antenna; and a switching circuit for selectively coupling signals between the antenna and the front stage port of the transceiver circuit.

The front stage transceiver circuit includes: transmitter subsystem operative to generate a front stage transmission signal; a front stage amplifier having an input for receiving the front stage transmission signal, and being operative to generate an amplified front stage transmission signal at an output thereof; a receiver subsystem having a receive port for receiving signals via the antenna; and a time division duplex (TDD) switching means being operative in the receive mode to couple the front stage port to the receive port of the receiver subsystem, and being operative in the transmit mode to couple the amplified front stage transmit signal to the front stage port.

The switching circuit includes: a transmitter amplifier having an input and an output, a receiver amplifier having an input and an output, a first circulator including a first port coupled for communication with the front stage port of the transceiver circuit, a second port selectively coupled with the output of the receiver amplifier via a first switching means, and a third port selectively coupled with the input of the transmitter amplifier via a second switching means, and a second circulator including a first port coupled for communication via the antenna, a second port coupled with the input of the receiver amplifier, and a third port coupled with the output of the transmitter amplifier.

The second switching means is operative in the receive mode to connect the third port of the first circulator to a first load impedance for absorbing energy reflected from the front stage transceiver circuit via the first circulator, and is operative in the transmit mode to connect the third port of the first circulator to the input of the transmitter amplifier. The first switching means is operative in the transmit mode to connect the second port of the first circulator to a second load impedance for absorbing energy reflected from the input of the transmitter amplifier via the first circulator, and is operative in the receive mode to connect the second port of the first circulator to the output of the receiver amplifier.

An important advantage of the present invention is that the switching circuit is very linear and provides increased system receiving sensitivity.

DETAILED DESCRIPTION OF THE PREFRRED EMBODIMENT

Figure 3:
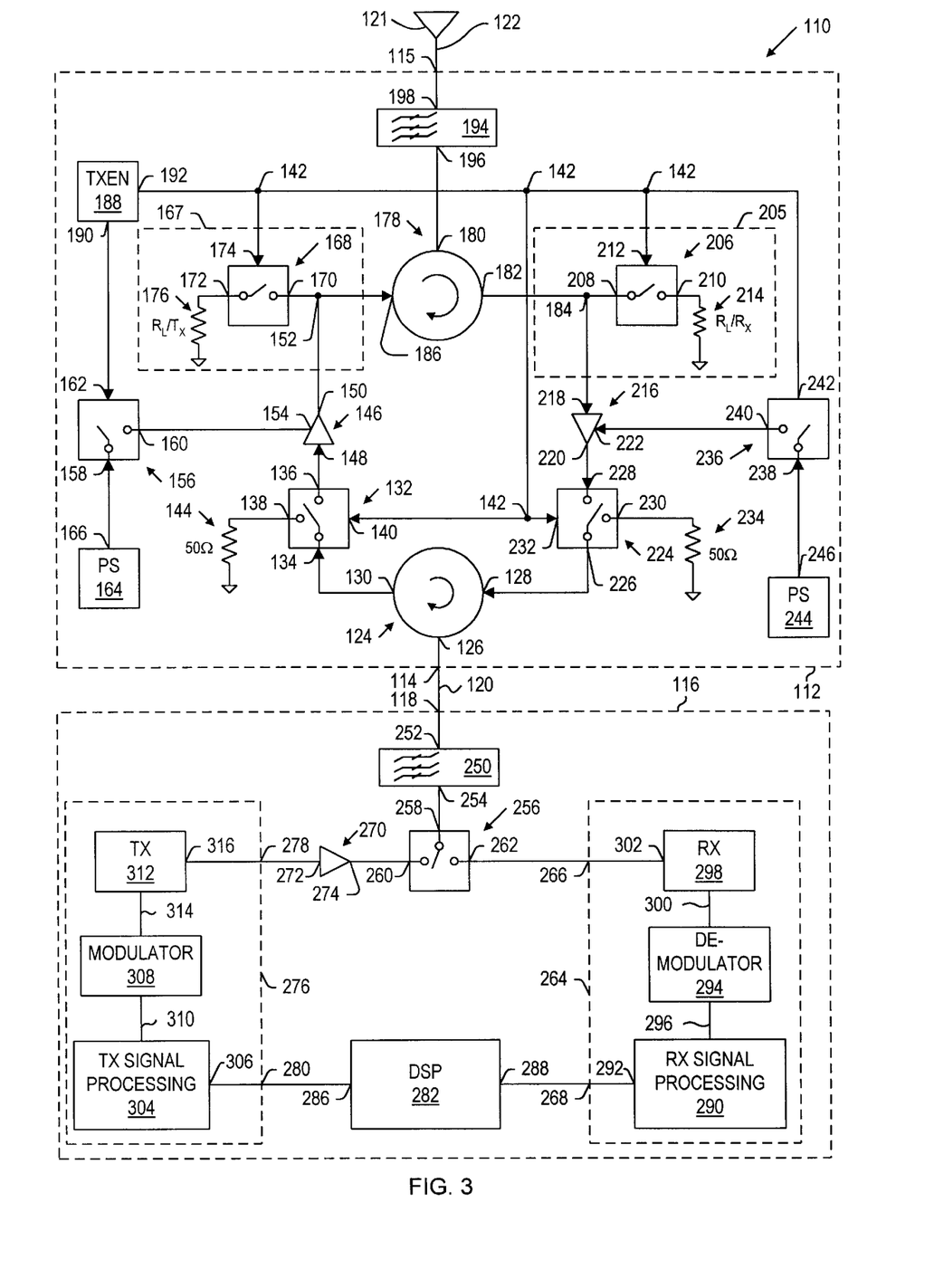
FIG. 3 is a schematic block diagram of a full duplex radio transceiver system in accordance with the present invention, the system including a front stage transceiver, an antenna switching circuit, and an antenna.

FIG. 3 shows a schematic block diagram at 110 of a transceiver system in accordance with the present invention. In an embodiment, the transceiver system 110 is adapted for use in a high power TDD wireless communication base station which provides multi-carrier wide-band duplex mode communication in accordance with the package transmission code division multiple access protocol standard (P-CDMA). The transceiver system 110 includes: an antenna switching circuit 112 having a transceiver port 114, and an antenna port 115; a front stage transceiver 116 having a port 118 coupled with port 114 of the antenna switching circuit 112 via a cable 120; and an antenna having a port 121 connected to port 115 of the antenna switching circuit 112 via a cable 122.

The antenna switching circuit 112 includes: a first circulator 124 having a first port 126 coupled with port 118 of the front stage transceiver 116 via port 114, a second port 128, and a third port 130; a three port switch 132 having a first port 134 connected to the third port 130 of the first circulator, a second port 136, a third port 138, and a control input 140 connected to a node 142; a load impedance 144 having a first terminal connected to the third port 138 of switch 132, and a second terminal connected to ground; a transmitter amplifier 146 having an input 148 connected to receive a transmission signal via the second port 136 of switch 132, an output 150 for providing an amplified transmission signal to a node 152, and a power supply port 154; a first 25 power supply switch 156 being a two-terminal switch and having a first port 158, and a second port 160 connected to the power supply port 154 of the transmitter amplifier 146, and a control port 162; a first power supply 164 having a port 166 connected to the first port 158 of switch 156; and a first switching sub-circuit 167 for selectively coupling port 186 of the second circulator to output 150 of the transmitter amplifier 146 as further described below. In the depicted embodiment, the switching sub-circuit 167 includes: a two-terminal switch 168 having a first port 170 connected to node 152, a second port 172, and a control port 174 connected to receive the TXEN control signal via node 142; and a countervailing impedance 176 having an impedance value of $R_L/T_X$ and having a first terminal connected to port 172 of switch 168, and a second terminal connected to ground.

The antenna switching circuit 112 also includes: a second circulator 178 having a first port 180, a second port 182 connected to a node 184, and a third port 186 connected to node 152; a TXEN node 188 connected to receive a TXEN control signal from control logic (not shown) of the front stage transceiver 116, the TXEN node 188 being connected to provide the TXEN control signal to the control port 162 of switch 156, and also being connected to node 142; a band-pass filter 194 having a first port 196 connected to the first port 180 of the second circulator 178, and a second port 198 for connection with the antenna 121 via the cable 122 and antenna port 115 of the switching circuit; and a second switching sub-circuit 205 for selectively coupling port 182 of the second circulator to a receiver amplifier 216 as further described below. In the depicted embodiment, the switching sub-circuit 205 includes: a two-port switch 206 having a first port 208 connected to node 184, a second port 210, and a control port 212 connected to receive the TXEN control signal via node 142; and a countervailing impedance 214 having an impedance value of $R_L/R_X$ and having a first terminal connected to port 210 of switch 206, and a second terminal connected to ground.

The antenna switching circuit 112 further includes: a receiver amplifier 216 being a low noise amplifier (LNA) and having an input 218 connected to node 184 to receive an incoming signal via the antenna, an output 220 for providing an amplified incoming signal, and a power supply port 222; a three-port switch 224 having a first port 226 connected to the second port 128 of the first circulator 124, a second port 228 connected to the output 220 of the receiver amplifier 216, a third port 230, and a control port 232 connected to receive the TXEN control signal via node 142; a load impedance 234 having an impedance value of 50 Ohms and having a first terminal connected to port 230 of switch 224, and a second terminal connected to ground; a second power supply switch 236 having a first port 238, a second port 240 connected to the power supply port 222 of the receiver amplifier 216, and a control port 242 connected to receive the TXEN control signal via node 142; and a second power supply 244 having an output 246 connected to provide a second power supply signal to the first port 238 of switch 236.

In an embodiment, each of the switches 132 and 224 is a single-pole, double-throw (RF SPDT) electronic switch (e.g., STANFORD MICRODEVICES Model SSW-224). Also, in an embodiment, each of the power supply switches 156 and 236 is a DC electronic switch (e.g., HARRIS Model RFIHK49157). Furthermore, each of the switches 168 and 206 may be a single-pole, single-throw SPST RF (e.g., STANFORD MICRODEVICES Model SSW-524).

Referring still to FIG. 3, the front stage transceiver 116 includes: a front stage band-pass filter 250 having a first port 252 connected to port 114 of the antenna switching circuit 112 via cable 120, and a second port 254; a TDD switch 256, also referred to as a transmitting/receiving duplexer, having a first terminal 258 connected to the second port 254 of filter 250, a second port 260, and a third port 262; a receiver subsystem 264 having a first port 266 coupled with the third port 262 of switch 256, and a second port 268; a front stage power amplifier 270 having an input 272, and an output 274 connected to port 260 of switch 256; a transmitter subsystem 276 having a first port 278 coupled for communication with the input 272 of the power amplifier 270, and a second port 280; and a digital signal processor (DSP) 282 having a first port 286 connected to port 280 of the transmitter subsystem 276, and a second port 288 connected to port 268 of the receiver subsystem 264.

The receiver subsystem 264 includes: a receiver signal processing unit 290 having a first port 292 coupled with port 288 of DSP 282; a demodulator unit 294 coupled for communication with unit 290 via a path 296; and a receiver 298 having a first port coupled for communication with demodulator 294 via a path 300, and a second port 302 coupled for communication with the third port 262 of switch 256.

The transmitter subsystem 276 includes: a transmitter, signal processing unit 304 having a first port 306 coupled for communication with port 286 of the DSP 282 via port 280; a modulator unit 308 coupled for communication with unit 304 via a path 310; and a transmitter 312 having a first port coupled for communication with modulator 308 via a path 314, and a second port 316 coupled for communication with input 272 of amplifier 270 via port 278 of the transmitter subsystem 276.

The front stage transceiver 116 may be implemented as a conventional TDD transceiver providing a relatively low output power ranging between approximately 0 and 10 dBm. (e.g., as PHS and CT2 base station etc.). The antenna switching circuit 112 provides a relatively high power output. In accordance with the present invention, the transceiver system 110 may be easily adapted to provide lower RF power by removing the antenna switching circuit 112 and connecting the antenna 121 directly to port 118 of the front stage transceiver 110 via the cable 120. During the transmit mode of operation, switch 256 of the front stage transceiver 116 is controlled by TDD logic (not shown) to connect port 260 to port 258. During the receive mode of operation, switch 256 is controlled to connect port 258 to port 258. During the transmit mode of operation, in order to protect the receiver 298, the port 262 of switch 256 must be substantially isolated from port 260 which receives an amplified signal from the amplifier 270. Therefore, switch 256 is designed appropriately in accordance with well known methods.

In order to increase isolation between a transmitting path and the receiving path (FIGS. 4 and 5), the supply of power to the amplifiers 146 and 216 is controlled by the switching of the power supply switches 156 and 236 in response to the TXEN control signal. As mentioned above, the control input of each the switches 132, 156, 168, 206, 224, and 236 is coupled to receive the TXEN control signal. In the transmit mode of operation, the TXEN control signal carries a digital TXEH value. In the receive mode of operation, the TXEN control signal carries a digital LOW value.

During the transmit mode of operation, the digital HIGH value applied to each of the switches of the antenna switching circuit 112 provides for controlling the switches to effect optimal transmission functioning. In the transmit mode: switch 132 is set to connect its first port 134 to its second port 136; the transmit power supply switch 156 is turned ON to provide the transmit power from power supply 164 to port 154 of the transmitter amplifier 146; switch 168 is turned OFF so that the countervailing load impedance 176 is isolated from node 152 which is connected to output 150 of the transmitter amplifier 146 and port 186 of the second circulator; switch 224 is set to connect its first port 226 to its third port 230 thereby connecting port 128 of the second circulator to the load impedance 234; switch 236 is turned OFF so that the power supply 244 is isolated from port 222 of the receiver amplifier 216; switch 206 is turned ON to connect the load impedance 214 to node 184 which is connected to input 218 of the receiver amplifier 216 and port 182 of the second circulator.

During the transmit mode of operation, an output power greater than 8 Watts is provided at port 115 of the antenna switching circuit 112, and the third inter-modulator for the whole transmitting path is less than −60 dBc.

When switch 206 is turned ON in the transmit mode, a signal path is provided between port 182 of the circulator 178 and the load impedance 214. The load impedance 214 provides a countervailing impedance.

With the power supply switch 236 turned OFF, the load impedance 214 and input impedance of the receiver amplifier 216 provide an equivalent impedance which matches the impedance at port 182 of the circulator 178.

During the receive mode of operation, the digital LOW value applied via the TXEN control signal to each of the switches of the antenna switching circuit 112 provides for controlling the switches to effect optimal receiver mode functioning. In the receive mode: switch 132 is set to connect port 134 to port 138; switch 156 is turned OFF so that the power supply 164 is isolated from input 154 of amplifier 146; switch 168 is turned ON so that the load impedance 176 is connected to output 150 of amplifier 146 and to port 186 of circulator 178; switch 224 is set to connect port 226 to port 228 thereby connecting port 128 of the first circulator to receive the incoming signal from the output 220 of the receiver amplifier 216; switch 236 is turned ON to connect the power supply 244 to the port 222 of amplifier 216; switch 206 is turned OFF to isolate the load impedance 214 from input 218 of amplifier 216 and port 182 of circulator 178.

With switch 206 turned OFF, the impedance at port 182 of circulator 178 is matched with the input impedance of the receiver amplifier 216.

When switch 168 is turned ON in the receive mode, the impedance at node 152 is determined as a function of the load impedance 176 and the output impedance at port 150 of the transmitter amplifier 146. The load impedance 176 and output impedance at port 150 of the amplifier are designed to provide a matching impedance which is matched to the impedance at port 186 of the circulator 178.

With ports 226 and 228 of switch 224 connected, the incoming signal received via the antenna propagates through band pass filter 194, circulator 178, amplifier 216, ports 228 and 226 of switch 224, and ports 128 and 126 of circulator 124 to port 118 of the front stage transceiver 116.

With switch 168 turned ON, the load impedance 176 and the output impedance of amplifier 146 provide a matching impedance for port 182 of circulator 178.

Figure 5:
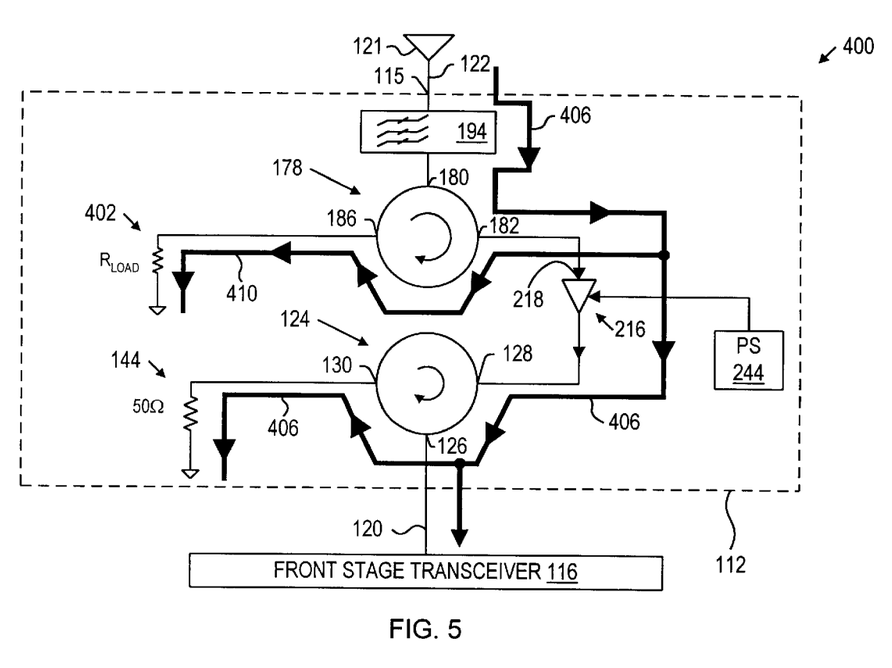
FIG. 5 is a schematic circuit diagram illustrating an equivalent circuit of the antenna switching circuit of FIG. 3 while operating in a receive mode.

Because switch 156 is turned OFF, PA power down, this ensures isolation between transmitting and receiving and the maximum and low noise amplifier input noise level becomes the minimum, to make receiver don't been blocked and decreases receiver noise of the background. Ports 134 and 138 of switch 132 are connected, make match for port 130 of circulator 124. Receiving equal path is as shown in FIG. 5.

The downstream insertion loss of each of the circulators 124 and 178 is approximately 0.7 dB. The upstream insertion loss of each of the circulators 124 and 178 is approximately 0.7 dB. The transmitter amplifier 146 provides a gain value ranging between 30 and 50 dB. The amplifier 146 provides an output power ranging between 30 and 40 dBm at IM3 less than 60 dBc.

Figure 4:
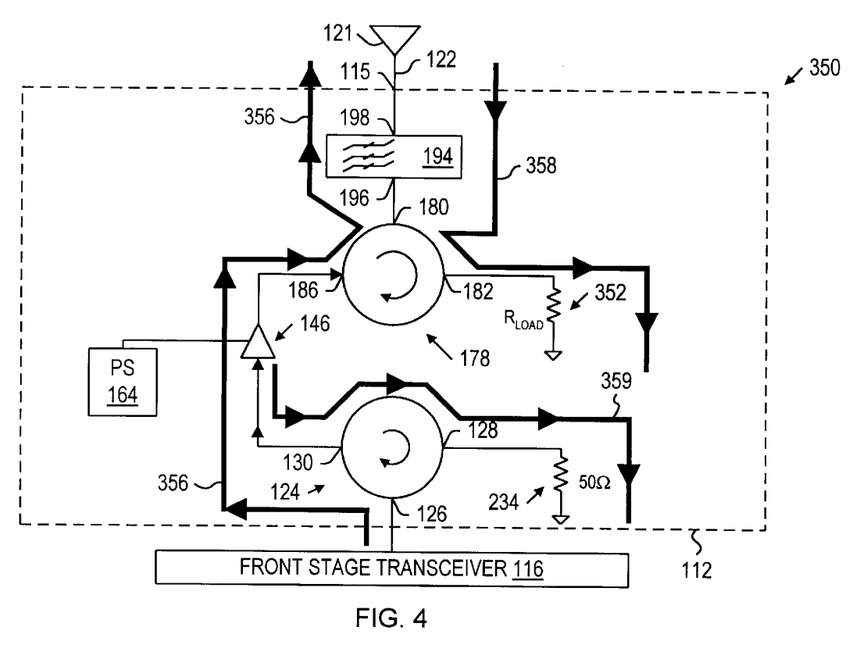
FIG. 4 is a schematic circuit diagram illustrating an equivalent circuit of the antenna switching circuit of FIG. 3 while operating in a transmit mode.

FIG. 4 shows a schematic circuit diagram illustrating an equivalent circuit at 350 of the antenna switching circuit 112 of the transceiver system 110 (FIG. 3) during operation in the transmit mode. An equivalent load impedance 352 is connected to port 182 of circulator 178, the impedance 352 being formed by load impedance 214 and the input impedance of the amplifier 216.

In the transmit mode of operation, the impedance of port 128 of circulator 124 is matched to the load impedance 234. The output impedance of amplifier 146 is matched with the impedance at port 186 of circulator 178. Because switch 236 is in the OFF condition, isolation between transmitting and receiving is improved. The transmission signal provided from front stage transceiver 116 to port 126 of the circulator 124 is circulated to port 130 of the circulator.

If an impedance mismatch occurs at the antenna 121 as a result of surrounding conditions or other effects, a portion of the RF transmitting power provided to the antenna 121 is reflected by the antenna 121 to port 180 of the second circulator 178 via the band pass filter 194. Because the circulator 178 is a single direction device as explained above. The reflected portion of the RF transmitting power is circulated by the circulator 178 from port 180 to port 182, and is absorbed by the load impedance 352. Likewise, if an impedance mismatch occurs at the input 148 of the amplifier 146, then a reflected portion of the RF transmitting power provided to the amplifier 146 is reflected by the amplifier 146 to port 130 of the first circulator 124, is circulated by the circulator 124 from port 130 to port 128, and is absorbed by the load impedance 234.

FIG. 5 shows a schematic circuit diagram illustrating an equivalent circuit at 400 of the antenna switching circuit 112 of the transceiver system 110 (FIG. 3) during operation in the receive mode. An equivalent load impedance 402 is connected to port 186 of circulator 178, the impedance 402 being formed by load impedance 176 and the output impedance of the transmit amplifier 146.

If an impedance mismatch exists at input 218 of the receiver amplifier 216 during operation in the receive mode, then a portion of the incoming signal will be reflected from the input 218 of the receiver 216 back toward port 182 of circulator 178. This reflected portion of the incoming signal is circulated by circulator 178 via ports 182 and 186, and is absorbed by the load impedance 402.

Likewise, if a mismatch occurs at the band pass filter 250 (FIG. 3) of the front stage transceiver 116, then a reflected portion of the incoming signal received via antenna 121 is absorbed by impedance 144.

It is important to optimize the receiver sensitivity of a transceiver system. As further explained below, a value may be determined for the cascaded noise figure of the transceiver system 110 (FIG. 3) relative to the cascaded noise figure of the prior art transceiver system 96 (FIG. 2). Assume that the noise figure and gain for the receiver 86 (FIG. 2) of the prior art transceiver system 96 (FIG. 2) is 8 dB and 40 dB respectively, and also that the noise figure and gain for the receiver 298 (FIG. 3) of the transceiver system 110 (FIG. 3) is 8 dB and 40 dB respectively. Also, assume that the gain provided by the receiver amplifier 216 is 14 dB, while the noise figure of the receiver amplifier 216 is 1.5 dB.

Figure 6:
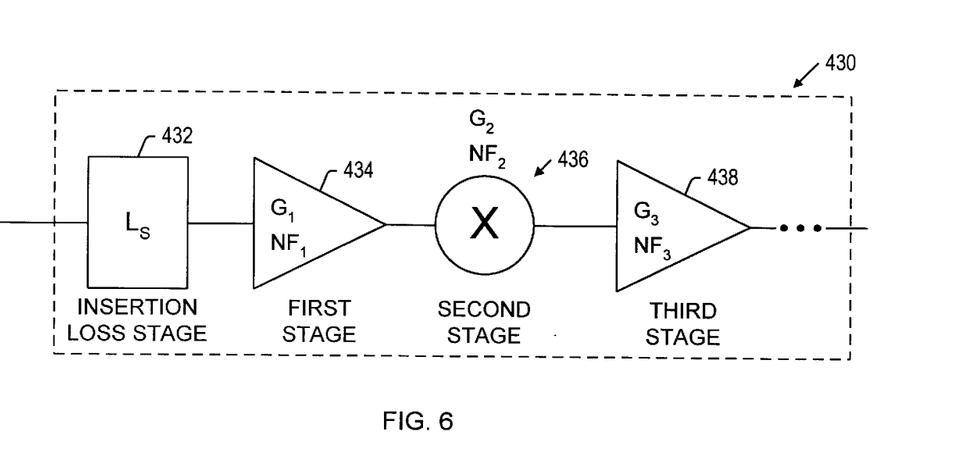
FIG. 6 is a block diagram illustrating a general model for calculating a cascaded noise figure.

FIG. 6 shows a block diagram illustrating a generalized model at 430 for calculating a cascaded noise figure for a system. The model 430 and formulas, further described below, allow for determining values for the noise figures of the prior art transceiver system 96 (FIG. 2) and the transceiver system 110 (FIG. 3) in accordance with the present invention. The noise figure model 430 comprises a series of cascaded stages including: an insertion loss stage 432 having an insertion loss $L_S$; a first stage 434 having a gain $G_1$, and a noise figure $NF_1$; a second stage 436 having a gain $G_2$, and a noise figure $NF_2$; and a third stage 438 having a gain $G_3$, and a noise figure $NF_3$, and so on.

Formula (1), below, provides a general expression for the cascaded noise figure for a system modeled in accordance with model 430.

$$NF = L_S + NF_1 + (NF_2-1)/G1 + (NF_3-1)/(G_1 \times G_2) + \ldots \quad (1)$$

For a transceiver system such as the prior art transceiver system 96 (FIG. 2) and the transceiver system 110 (FIG. 3), the insertion loss stage 432 corresponds with all components preceding the first active amplifier in the cascaded signal path.

For purposes of modeling the cascade noise figure of the prior art transceiver system 96 (FIG. 2) during operation in the receive mode: the insertion loss stage 432 (FIG. 6) corresponds with the band pass filter 48, circulator 40, and switch 56 (FIG. 2) which cause an insertion loss Ls; the first stage 434 corresponds with a first internal amplifier stage (not shown) of the receiver 86 (FIG. 2), the first internal amplifier stage providing a gain $G_1$ and a noise figure $NF_1$; and the second and third stages 436 and 438 correspond with second and third internal amplifier stages (not shown) of the receiver 86 (FIG. 2) which have gains $G_2$ and $G_3$, and noise figures $NF_2$ and $NF_3$ respectively.

For purposes of modeling the cascade noise figure of the transceiver system 110 (FIG. 3) during operation in the receive mode: the insertion loss stage 432 (FIG. 6) corresponds with the switch 256 (FIG. 3), band pass filter 250, circulator 124, and switch 224; the first stage 434 corresponds with a first internal amplifier stage (not shown) of the receiver 298 (FIG. 3) which provides a gain a gain $G_1$ and a noise figure $NF_1$; and the second and third stages 436 and 438 correspond with second and third internal amplifier stages (not shown) of the receiver 298 (FIG. 3) which provide gains $G_2$ and $G_3$, and noise figures $NF_2$ and $NF_3$ respectively.

Figure 7:
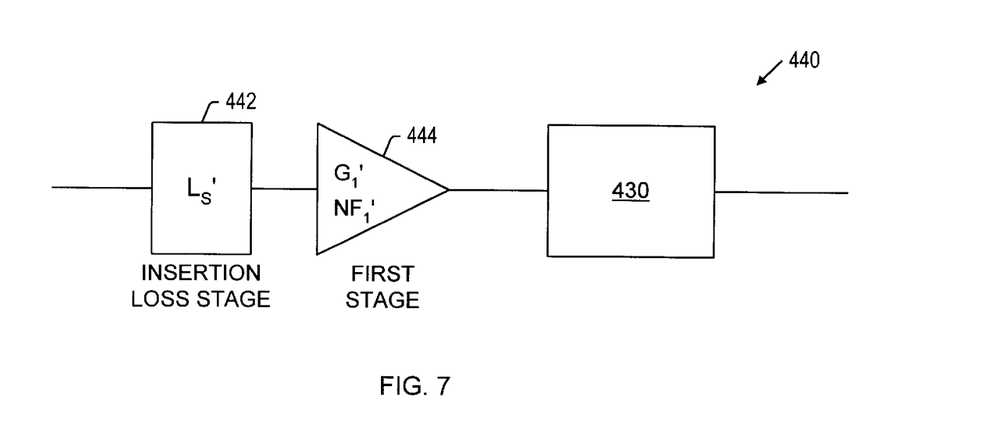
FIG. 7 is a block diagram illustrating a model for calculating the cascaded noise figure of the transceiver system of FIG. 3.

FIG. 7 is a block diagram illustrating a model at 440 for calculating the cascaded noise figure of the transceiver system 110 (FIG. 3) relative to the cascaded noise figure model 430 (FIG. 6) of the transceiver system 96 (FIG. 2). The noise figure model 440 comprises a series of cascaded stages including: an insertion loss stage 442 having an insertion loss $L_S'$; a first stage 444 having a gain $G_1'$, and a noise figure $NF_1'$; and the series of cascaded stages 432, 434, 436 and 438 of the noise figure model 430 (FIG. 6).

The receiving amplifier 216 (FIG. 3) provides a gain $G_1'$ and a noise figure $NF_1'$; and the band pass filter 194 and circulator 178 (FIG. 3) have an insertion loss $L_S'$.

According to the above stated assumptions and formula (1), values for the noise figure and gain of the receiver 86 (FIG. 2) and receiver 298 (FIG. 3) may be determined in accordance with expressions (2) and (3), below.

$$NF_{dB} = (NF_1 + (NF_2-1)/G1 + (NF_3-1)/(G_1 \times G_2) + \ldots)_{dB} = 8 \text{ dB} \quad (2)$$

$$\text{Gain} = (G1 + G2 + G3 + \ldots)_{dB} = 40 \text{ dB} \quad (3)$$

Expression (4), below, yields a dB value determined in accordance with formula (1), above, for the cascaded noise figure of the prior art transceiver system 96 (FIG.2) during operation in the receive mode.

$$NF_{dB} = 1.3 + 0.7 + 0.7 + 0.7 + 8 = 11.4 \text{ dB} \quad (4)$$

Expression (5), below, yields a value determined in accordance with formula (1), above, for the cascaded noise figure of the transceiver system 110 (FIG. 3) during operation in the receive mode.

$$NF = 10^{0.35} + (10^{1.13}-1)/10^{1.4} = 2.2387 + 0.4972 = 2.7359 \quad (5)$$

Expression (6), below, yields a dB value determined in accordance with formula (1), above, for the cascaded noise figure of the transceiver system 110 (FIG. 3) during operation in the receive mode.

$$NF_{dB} = 10 \text{ Log } 2.7359 = 4.37 \text{ dB} \quad (6)$$

According to formulas (1) through (6), above, the antenna switching circuit 112 (FIG. 3) of the present invention provides an improved cascaded noise figure as compared with the cascaded noise figure of the prior art transceiver 96 (FIG. 2). Therefore, the antenna switching circuit 112 (FIG. 3) provides a receiving sensitivity which is improved by approximately 7.1 dB over the prior art antenna switching circuits. The smaller noise figure and improved receiving sensitivity of the transceiver system 110 (FIG. 3) is due principally to the receiving amplifier 216.

In order to ensure multi-carrier inter-modulation, switches 132 and 224, amplifier 146, circulator 178, receiver amplifier 216, and band pass filter 194 of the antenna switching circuit 112 are designed to function in an optimally linear manner.

Figure 8:
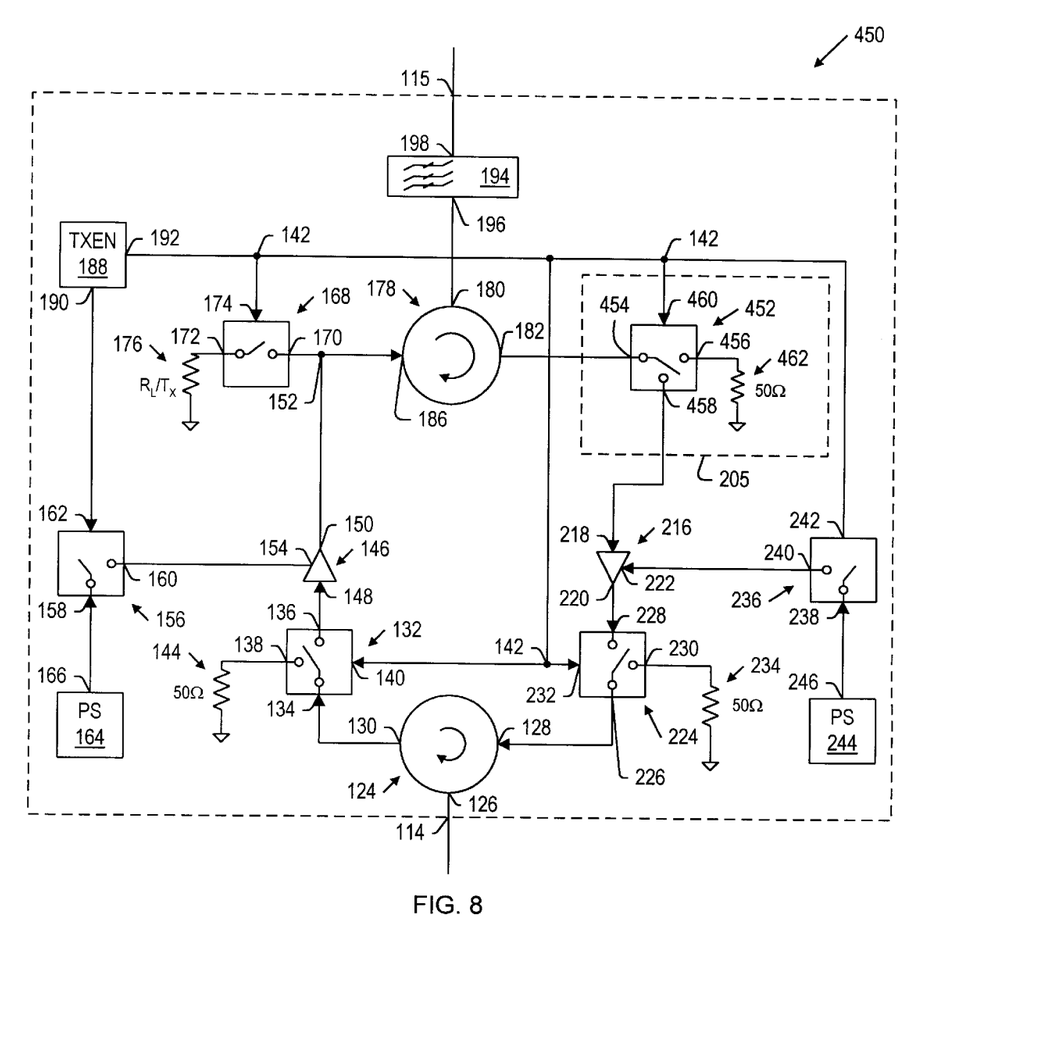
FIG. 8 is a schematic block diagram illustrating a first alternative embodiment of the antenna switching circuit of FIG. 3 in accordance with the present invention.

FIG. 8 shows a schematic block diagram illustrating an alternative embodiment at 450 of the antenna switching circuit 112 (FIG. 3) in accordance with the present invention. The depicted antenna switching circuit 450 varies from circuit 112 (FIG. 3) in the implementation of the switching sub-circuit 205. In the depicted embodiment, the switching sub-circuit 205 includes: a three port switch 452 having a first port 454 connected to port 182 of the second circulator, a second port 456, a third port 458 connected to input 218 of the receiver amplifier 216, and a control port 460 connected to receive the TXEN control signal via node 142; and a load resistor 462 having an impedance value of 50 Ohms and having a first terminal connected to the second port 456 of switch 452, and having a second terminal connected to ground.

During the receive mode of operation, a digital LOW value applied to port 460 via the TXEN control signal causes switch 452 to connect its first port 454 to its third port 458 thereby providing a connection between port 182 of the second circulator and input 218 of the receive amplifier 216. During the transmit mode of operation, a digital HI value applied to port 460 via the TXEN control signal causes switch 452 to connect its first port 454 to its second port 456 thereby providing a connection between port 182 of the second circulator and the load impedance 462 which provides absorption of RF energy reflected from the antenna 121 (FIG. 3).

The depicted switching circuit 450 provides an advantage over the circuit 112 (FIG. 3) in that it is easier to achieve an impedance match for port 182 of the second circulator during the transmit mode of operation because the input port 218 of the receiver amplifier 216 is isolated from port 182 of the second circulator during the transmit mode. Another advantage provided by the antenna switching circuit 450 over the antenna switching circuit 112 (FIG. 3) is that the amplifier 216 is protected from possible damage due to more reflected RF transmitting power instantaneously. However, the receiver sensitivity of the depicted switching circuit 450 is decreased as compared with that of the circuit 112 (FIG. 3) due to the insertion loss incurred between the first and third ports 454 and 458 of the switch 452 as it operates in the receive mode.

Although the present invention has been particularly shown and described above with reference to a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A time division duplex switching circuit for selectively coupling signals between an antenna and a front stage transceiver circuit, said switching circuit being operative in a transmit mode and in a receive mode, said switching circuit comprising:

a transmitter amplifier having an input and an output;

a receiver amplifier having an input and an output;

a first circulator including a first port coupled for communication with the front stage transceiver, a second port selectively coupled with said output of said receiver amplifier via a first switching means, and a third port selectively coupled with said input of said transmitter amplifier via a second switching means; and a second circulator including a first port coupled for communication via the antenna, a second port coupled with said input of said receiver amplifier, and a third port coupled with said output of said transmitter amplifier;

said second switching means being operative in the receive mode to connect said third port of said first circulator to a first load impedance for absorbing energy reflected from said front stage transceiver via said first circulator, and being operative in the transmit mode to connect said third port of said first circulator to said input of said transmitter amplifier;

said first switching means being operative in the transmit mode to connect said second port of said first circulator to a second load impedance for absorbing energy reflected from said input of said transmitter amplifier via said first circulator, and being operative in the receive mode to connect said second port of said first circulator to said output of said receiver amplifier.

2. A time division duplex switching circuit as recited in claim 1 wherein said third port of said second circulator is connected to said output of said transmitter amplifier via a first node, and wherein said switching circuit further comprises a first countervailing impedance switch that is operative in the receive mode to connect said first node to a first countervailing impedance load for absorbing energy reflected from said input of said receiver amplifier via said second circulator.

3. A time division duplex switching circuit as recited in claim 1 wherein said second port of said second circulator is connected to said input of said receiver amplifier via a second node, and wherein said switching circuit further comprises a second countervailing impedance switch that is operative in the transmit mode to connect said second node to a second countervailing impedance load for absorbing energy reflected from the antenna via said second circulator.

4. A time division duplex switching circuit as recited in claim 1 wherein said second port of said second circulator is selectively coupled with said input of said receiver amplifier via a countervailing impedance switching means which is operative in said receive mode to connect said second port of said second circulator to said input of said receiver amplifier, said countervailing impedance switching means being operative in said transmit mode to connect said second port of said second circulator to a countervailing load impedance for absorbing energy reflected from said input of said transmitter amplifier via said second circulator.

5. A time division duplex switching circuit as recited in claim 1 wherein said third port of said second circulator is selectively coupled with said output of said transmitter amplifier via a countervailing impedance switching means which is operative in said transmit mode to connect said third port of said second circulator to said output of said transmitter amplifier, said countervailing impedance switching means being operative in said receive mode to connect said third port of said second circulator to a countervailing load impedance for absorbing energy reflected from said input of said receiver amplifier via said second circulator.

6. A time division duplex switching circuit as recited in claim 1 further comprising:

a first power supply for providing power to said transmitter amplifier; and a first power supply switching means for selectively connecting said first power supply to said transmitter amplifier, said first power supply switching means being operative to connect said first power supply to said transmitter amplifier during said transmit mode, and being operative to isolate said first power supply from said transmitter amplifier during said receive mode.

7. A time division duplex switching circuit as recited in claim 1 further comprising:

a second power supply for providing power to said receiver amplifier; and a second power supply switching means for selectively connecting said first power supply to said receiver amplifier, said second power supply switching means being operative to connect said second power supply to said transmitter amplifier during said transmit mode, and being operative to isolate said second power supply from said transmitter amplifier during said receive mode.

8. A time division duplex switching circuit as recited in claim 1 wherein the receiver amplifier is a low noise amplifier.

9. A time division duplex switching circuit as recited in claim 1 further comprising a band pass filter coupled between said first port of said second circulator and said antenna, said filter providing attenuation of unnecessary radio waves in both the transmitting mode and the receiving mode.

10. A time division duplex switching circuit as recited in claim 1 wherein said first and second switching means are responsive to a signal received from the front stage transceiver circuit.

11. A time division duplex transceiver system for use in a multi-carrier wireless communication system, said system being operative in a transmit mode and in a receive mode, said system comprising:
- an antenna for transmitting and receiving information;
- a front stage transceiver circuit having a front stage port for transmitting and receiving signals via said antenna, said front stage transceiver circuit including,
  - a transmitter subsystem operative to generate a front stage transmission signal,
  - a front stage amplifier having an input for receiving said front stage transmission signal, and being operative to generate an amplified front stage transmission signal at an output thereof,
  - a receiver subsystem having a receive port for receiving signals via said antenna;
  - a time division duplex (TDD) switching means being operative in the receive mode to couple said front stage port to said receive port of said receiver subsystem, and being operative in the transmit mode to couple said amplified front stage transmit signal to said front stage port;
- a switching circuit for selectively coupling signals between said antenna and said front stage port of said transceiver circuit, said switching circuit including,
  - a transmitter amplifier having an input and an output,
  - a receiver amplifier having an input and an output,
  - a first circulator including a first port coupled for communication with said front stage port of said transceiver circuit, a second port selectively coupled with said output of said receiver amplifier via a first switching means, and a third port selectively coupled with said input of said transmitter amplifier via a second switching means, and
  - a second circulator including a first port coupled for communication via said antenna, a second port coupled with said input of said receiver amplifier, and a third port coupled with said output of said transmitter amplifier,
  - said second switching means being operative in the receive mode to connect said third port of said first circulator to a first load impedance for absorbing energy reflected from said front stage transceiver circuit via said first circulator, and being operative in the transmit mode to connect said third port of said first circulator to said input of said transmitter amplifier,
  - said first switching means being operative in the transmit mode to connect said second port of said first circulator to a second load impedance for absorbing energy reflected from said input of said transmitter amplifier via said first circulator, and being operative in the receive mode to connect said second port of said first circulator to said output of said receiver amplifier.

12. A time division duplex transceiver system as recited in claim 11 wherein said third port of said second circulator is connected to said output of said transmitter amplifier via a first node, and wherein said switching circuit further comprises a first countervailing impedance switch that is operative in the receive mode to connect said first node to a first countervailing impedance load for absorbing energy reflected from said input of said receiver amplifier via said second circulator.

13. A time division duplex transceiver system as recited in claim 11 wherein said second port of said second circulator is connected to said input of said receiver amplifier via a second node, and wherein said switching circuit further comprises a second countervailing impedance switch that is operative in the transmit mode to connect said second node to a second countervailing impedance load for absorbing energy reflected from the antenna via said second circulator.

14. A time division duplex transceiver system as recited in claim 11 wherein said second port of said second circulator is selectively coupled with said input of said receiver amplifier via a countervailing impedance switching means which is operative in said receive mode to connect said second port of said second circulator to said input of said receiver amplifier, said countervailing impedance switching means being operative in said transmit mode to connect said second port of said second circulator to a countervailing load impedance for absorbing energy reflected from said input of said transmitter amplifier via said second circulator.

15. A time division duplex transceiver system as recited in claim 11 wherein said third port of said second circulator is selectively coupled with said output of said transmitter amplifier via a countervailing impedance switching means which is operative in said transmit mode to connect said third port of said second circulator to said output of said transmitter amplifier, said countervailing impedance switching means being operative in said receive mode to connect said third port of said second circulator to a countervailing load impedance for absorbing energy reflected from said input of said receiver amplifier via said second circulator.

16. A time division duplex transceiver system as recited in claim 11 wherein said switching circuit further includes:
- a first power supply for providing power to said transmitter amplifier; and
- a first power supply switching means for selectively connecting said first power supply to said transmitter amplifier, said first power supply switching means being operative to connect said first power supply to said transmitter amplifier during said transmit mode, and being operative to isolate said first power supply from said transmitter amplifier during said receive mode.

17. A time division duplex transceiver system as recited in claim 11 wherein said switching circuit further includes:
- a second power supply for providing power to said receiver amplifier; and
- a second power supply switching means for selectively connecting said first power supply to said receiver amplifier, said second power supply switching means being operative to connect said second power supply to said transmitter amplifier during said transmit mode, and being operative to isolate said second power supply from said transmitter amplifier during said receive mode.

18. A time division duplex transceiver system as recited in claim 11 wherein said receiver amplifier is a low noise amplifier.

19. A time division duplex transceiver system as recited in claim 11 wherein said switching circuit further includes a band pass filter coupled between said first port of said second circulator and said antenna, said filter providing attenuation of unnecessary radio waves in both the transmitting mode and the receiving mode.

20. A time division duplex transceiver system as recited in claim 11 wherein each of said first and second switching means, and said time division duplex switching means is responsive to a signal generated by the front stage transceiver circuit.

* * * * *